United States Patent [19]
Himmler

[11] Patent Number: 5,421,199
[45] Date of Patent: Jun. 6, 1995

[54] METHOD AND APPARATUS FOR UNBALANCE MEASUREMENT FOR UNBALANCE COMPENSATION TO BE CARRIED OUT IN TWO COMPENSATING PLANES ON A ROTARY MEMBER

[75] Inventor: Günther Himmler, Darmstadt, Germany

[73] Assignee: Hofmann Maschinenbau GmbH, Pfungstadt, Germany

[21] Appl. No.: 910,922

[22] Filed: Jul. 9, 1992

[30] Foreign Application Priority Data

Jul. 10, 1991 [DE] Germany .................. 4122816.2

[51] Int. Cl.$^6$ ............................................ G01M 1/22
[52] U.S. Cl. .................................... 73/462; 73/1 B; 364/571.02
[58] Field of Search ............... 73/1 B, 462; 364/508, 364/571.02, 571.05

[56] References Cited

U.S. PATENT DOCUMENTS 4,098,127  7/1978  Shiga et al. ..................... 73/462
4,495,811  1/1985  Muller et al. ................... 73/462

FOREIGN PATENT DOCUMENTS 0133229  2/1985  European Pat. Off. .
2756829  6/1979  Germany .

OTHER PUBLICATIONS

Von Dr.–Ing. H. Steudel, "Lagerschwingungen–Wellenschwingugen;" VDI–Berichte Nr88, 1965, pp. 57–64.
Von Gunther Himmler, "Programmiertes Betriesbsauswuchten anhand von Einflusskoeffizienten;" VDI-Z 121 (1979) Nr. 11–Juni (1) pp. 585–589.
Gunther Himmler; *Hofmann Info 9*, "Rechnergestutztes Betriebsauswuchten."
Gunther Junck; *Hofmann News 5* Gebr. Hofmann GmbH & Co., KG D6102 Pfungstadt, "Messverfahrenund Messgerate der Hofmann—Auswuchtmaschinen."

*Primary Examiner*—John E. Chapman
*Attorney, Agent, or Firm*—Cushman, Darby & Cushman

[57] ABSTRACT

A method of unbalance measurement of a rotary member for balancing thereof in first and second compensating planes includes the steps of: performing test runs wherein the rotary member is rotated about is axis with test weights on the rotary member rotating in different planes thereof, the planes being perpendicular to the axis of rotation of the rotary member, and in each test run the effects of centrifugal forces produced by the test weights are measured simultaneously in more than two measuring planes which differ from the planes in which the test weights rotate so as to provide correlation coefficient matrices in the respective measuring planes; evaluating all of the determinants associated with a given type of rotary member; and ascertaining unbalance vectors of a rotary member of a given type in the respective measuring planes by use of the measuring planes which are determined by the correlation coefficient matrix whose determinant is greatest for that type of rotary member.

7 Claims, 2 Drawing Sheets

METHOD AND APPARATUS FOR UNBALANCE MEASUREMENT FOR UNBALANCE COMPENSATION TO BE CARRIED OUT IN TWO COMPENSATING PLANES ON A ROTARY MEMBER

BACKGROUND OF THE INVENTION

An operating procedure for the purposes of measuring unbalance to provide for unbalance compensation which is to be carried out on a rotary member to be balanced, in first and second compensating planes, provides that test runs are performed in which the effects of centrifugal forces which are generated by given test weights which rotate around the axis of the rotary member at given radii and in different planes perpendicular to the axis of the rotary member are measured in measuring planes, and are used for the purposes of calibrating the unbalance measuring system.

To carry out an unbalance measuring procedure on a rotary member which requires unbalancing, the rotary member can be mounted in a spring-mass system which is capable of vibration or oscillation in order to ascertain the compensating or balancing masses or weights required in first and second compensating planes, in a dynamic unbalance compensating operation. When carrying out the measurement operation, centrifugal forces which result from the unbalance of the rotary member produce movements which are perpendicular to the axis of the rotary member, or the mounting axis, in the oscillating system. The movements or centrifugal forces resulting from the rotary member unbalance are measured by measurement value sensors in measuring planes and corresponding electrical measurement signals are formed. When the measurement signals are evaluated, what is known as a plane separation apparatus is used to determine mass compensation in the compensating planes on the rotary member, in such a fashion that the oscillating movements at the mounting locations of the system are made zero.

It is known (German laid-open application (DE-OS) No 27 56 829 and the VDI publication 121 (1979) No 11, June, pages 585 through 589, G. Himmler, 'Programmiertes Betriebsauswuchten anhand von Einflusskoeffizienten' ['Programmed operational balancing on the basis of correlation cofficients']) to describe the transfer characteristics in respect of two unbalances U1 and U2 in two planes of the rotary member to two measurement value sensors in measuring planes which are different with respect to the two planes of the rotary member, and the signals X1 and X2 supplied by the measurement value sensors, by means of a linear equation system in accordance with the following matrix equation (1):

$$\begin{vmatrix} X_1 \\ X_2 \end{vmatrix} = \begin{vmatrix} a_{11} & a_{12} \\ a_{21} & a_{22} \end{vmatrix} \cdot \begin{vmatrix} U_1 \\ U_2 \end{vmatrix} \quad (1)$$

The matrix elements a11, a12, a21 and a22 are correlation coefficients or influence coefficients which describe the characteristics of the unbalance measuring system. They form a correlation or influence coefficient matrix in respect of the linear equation system.

To provide for plane separation, the equation system (1), in respect of the unknown unbalances U1 and U2, is solved in accordance with the following equation system (2):

$$\begin{vmatrix} U_1 \\ U_2 \end{vmatrix} = \begin{vmatrix} a_{11} & a_{12} \\ a_{21} & a_{22} \end{vmatrix}^{-1} \cdot \begin{vmatrix} X_1 \\ X_2 \end{vmatrix} \quad (2)$$

The measuring signals X1 and X2 are ascertained as measuring parameters, in the unbalance measuring operation. The correlation coefficients have to be determined by system identification. As is known from the VDI publication 121 (1979), No 11, June, pages 585 through 589, or the publication Hofmann Info 9 (impressum 9632 098 08-77), that is effected by first inserting a test weight into the one compensating plane of the rotary member and measuring the resulting effects (forces or movements) in two measuring planes. Then, a second test weight is inserted into the other compensating plane of the rotary member and the resulting effect (forces or movements) are ascertained in the two measuring planes. Those measurement values and the test unbalances are then used to calculate the correlation or influence coefficients which form the matrix elements of the above-indicated linear equations (1) and (2), the latter then being evaluated for the purposes of plane separation.

So that the solutions of equation system (2) are clear, linear independency of equation system (1) is required, in other words, the determinant of the correlation coefficient matrix is not equal to zero. As different types of rotary members are measured in unbalance measuring assemblies, it is inevitable that a measuring plane comes to lie at the center of vibration or vibration node of the measuring system or that one of the two measuring planes is at an only small distance relative to the node of the measuring system. If the measuring plane is at the vibration node, that situation involves a singular state and the determinant of the coefficient matrix becomes zero. No plane separation is then possible. In situations in which one of the two measuring planes is at a small distance relative to the node of the system, the determinant of the coefficient matrix becomes of low value so that in terms of determining unbalance phenomena numeric difficulties occur and the measuring system has only poor plane separation characteristics.

As is known from EP 0 133 229 B1, it is possible for test weights to be arranged in a plurality of successive, axially spaced-apart calibration planes and to carry out a plurality of test runs. Calibration data are derived from the plurality of test runs, and such data can be used to reduce the error component of the detected unbalance in predetermined unbalance correction planes. It will be appreciated however that the plurality of test runs or calibration runs required with that operating procedure involves a high level of expenditure in terms of time and trouble in carrying the process into effect.

SUMMARY OF THE INVENTION

An object of the present invention is to provide a method of unbalance measuring for an unbalance compensating operation on a rotary member in a number of compensating planes, which permits satisfactory plane separation when dealing with different types of rotary members without an increase in operational complexity and expenditure.

Another object of the present invention is to provide a method of unbalance measuring for an unbalance compensating operation to be carried out on a rotary member in different compensating planes which permits a given measuring system to be used for different types of rotary members and which provides for satisfactory plane separation in a simple operating procedure and with enhanced versatility of use.

Still another object of the present invention is to provide an apparatus for unbalance measurement on a rotary member to be balanced in a plurality of compensating planes, which is suited to different types of rotary members to be balanced and which provides reliable operating results while being readily integratable into an automatic balancing system.

In accordance with the present invention, in regard to the method aspect thereof, the foregoing and other objects are attained by a method of unbalance measurement, for an unbalance compensating operation to be carried out on a rotary member, for example a motor vehicle wheel, in first and second compensating planes, wherein the effects of centrifugal forces produced by certain test weights rotating about the axis of the rotary member in different planes perpendicular to the axis of the rotary member and at given radii are measured in measuring planes in test runs, and evaluated for calibration of the unbalance measuring system. In each of the test runs, the effects are measured simultaneously in more than two measuring planes which differ from the planes in which the test weights rotate. Of the measurement results obtained in the respective measuring planes, a combination comprising respective first and second measurement results associated with a given type of rotary member is evaluated, for a rotary member type-related calibration operation. The unbalance vectors are ascertained in the respective first and second measurement planes which are related to the type of rotary member, to which the respective rotary member to be balanced belongs.

Further in accordance with the invention, in regard to the apparatus aspect thereof, the foregoing and other objects are achieved by an apparatus for unbalance measurement on a rotary member which is to be balanced in first and second compensating planes. The apparatus comprises a rotary member mounting structure for supporting the rotary member to be balanced, the rotary member mounting structure being supported by way of spring structure on a frame structure of the apparatus. The apparatus further has measurement value generating means or sensors which detect oscillations or vibrations and/or forces acting on the rotary member mounting means, and an evaluation means which is connected to the measurement value sensors and which is adapted to evaluate measurement signals supplied by the sensors, thereby to determine the unbalance compensation operation which is to be carried out in the first and second compensating planes on the rotary member. The apparatus further includes a calibration means adapted to be connected to the sensors for determining calibration values for plane separation in the unbalance measurement operation. More than two measurement value sensors are disposed along the axis of the rotary member mounting means and a storage means such as a memory device is operable to store rotary member-typical calibration values which are each associated with a respective pair of measurement value sensors and which are determined in the calibration means. The apparatus further includes a control means which is connected to the storage means and which is operable to connect respective first and second measurement value sensors which are associated with the type of rotary member to be balanced in the storage means, to the evaluation means for determining the unbalance vectors related to the compensating planes of the rotary member. The evaluation means has access to the rotary, member type-related calibration values which are in the storage means.

It will be noted at this point that, in the case of a fixed mass-spring system, the position of the center of oscillation or node depends on the spring characteristics of the system, the mass ratios, the mass moment of inertia and the natural oscillation condition of the measuring system. As different types of rotary members with different rotary member masses and mutually different mass moments of inertia usually have to be balanced on a balancing machine, it is inevitable that the center of oscillation or the node moves along the axis of the rotary member to be balanced, depending on the type of rotary member involved. In that situation, the node may approach a measuring plane to such a degree that the determinant of the correlation coefficient matrix assumes such low values that it is no longer possible to provide for satisfactory plane separation.

The present invention involves the provision of more than two measuring planes, for example three, four or more planes. A measurement value generating means or sensor is provided at each measuring plane. For a test weight which is arranged in particular in a compensating plane of the rotary member, that is to say a plane at which a balancing operation may subsequently be carried out on the rotary member, each of the more than two measuring planes involves the production of measurement values which are ascertained simultaneously in the same test run. It is sufficient to carry out two test runs with two test weights, of which the one test weight is arranged in the one compensating plane and the other test weight is arranged in the other compensating plane of the rotary member.

It may be noted at this point that it is known to provide a plurality of measuring locations in the axial direction when dealing with elongated rotors, for example when ascertaining the running properties of turbogenerators (see VDI-Berichte No 88, 1965, pages 57–64 and German laid-open application (DE-OS) No 24 07 705). In such situations however it is shaft-mounting oscillations of the elongated rotor that are observed.

In contrast thereto, the present invention involves the utilisation of the plurality of and more particularly more than two measuring planes in order to achieve adequate plane separation for a given type of rotary member when carrying out a dynamic unbalance compensating operation. Two test runs are sufficient to ascertain a coefficient matrix which is suitable for plane separation in relation to the respective type of rotary member being dealt with, on one and the same balancing machine for dealing with different types of rotary members.

The invention is preferably employed in wheel balancing machines for balancing motor vehicle wheels in which the rotary member to be balanced, that is to say the motor vehicle wheel, is clamped on to a main shaft of the balancing machine. However it will be appreciated that the invention can also be used in what are known as universal machines which can be employed for example for balancing elongate rotors, for example and more particularly crankshafts and drive or cardan shafts, in which the rotary member to be balanced is supported in bearing units (reference may be made in this respect to Hofmann Info 3, Impressum 9632142, 05.88).

Further objects, features and advantages of the present invention will be apparent from the following description of a preferred embodiment.

DESCRIPTION OF THE PREFERRED EMBODIMENT

Figure 1:
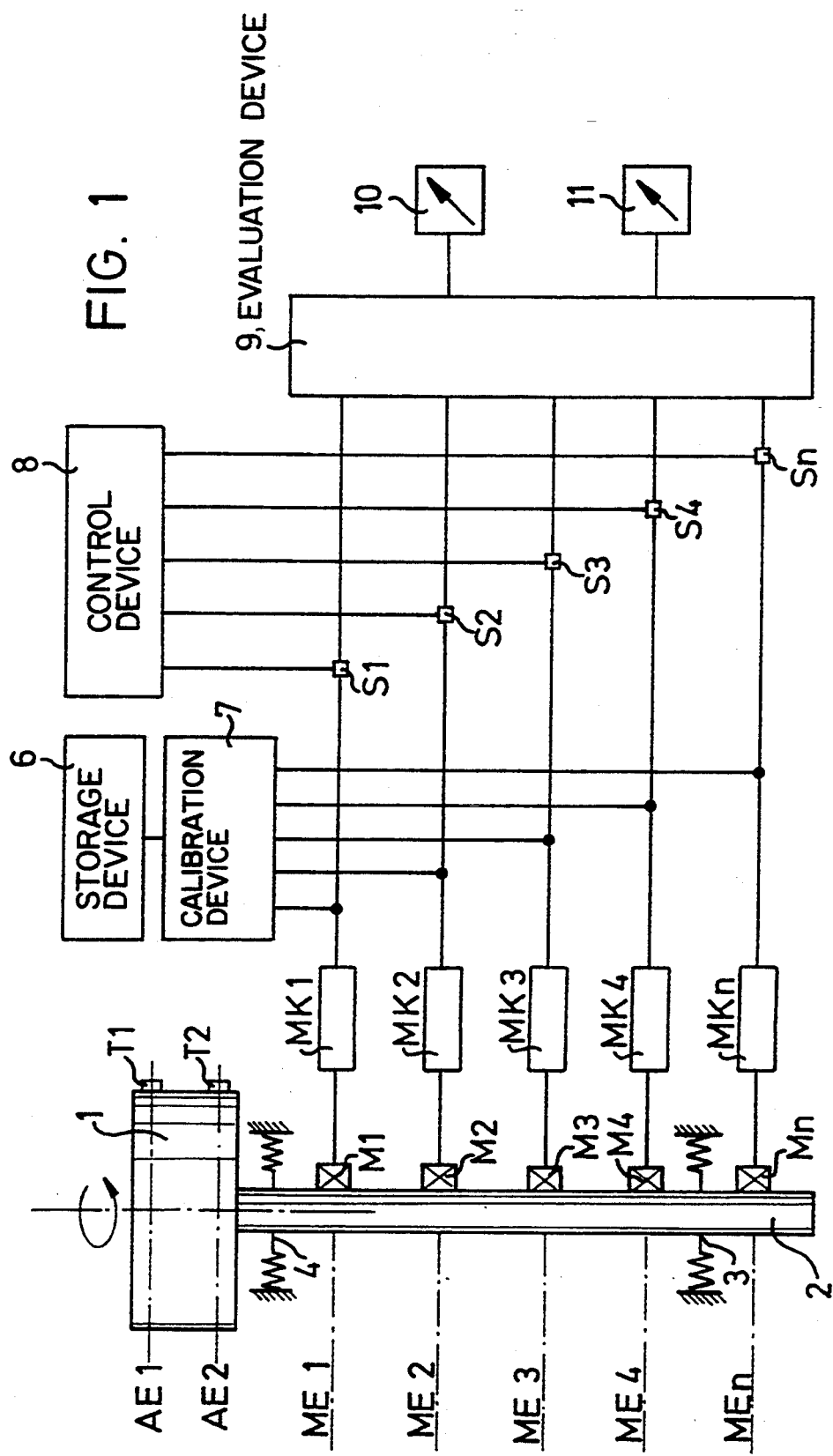
FIG. 1 is a diagrammatic view of a measuring arrangement of an embodiment of the invention.

Referring firstly to FIG. 1, shown therein in diagrammatic form is an embodiment of the present invention, in which respective measurement value generating means or sensors M1, M2, ... Mn are disposed along a main shaft 2 of a balancing machine, in respective measuring planes ME1, ME2, ..., MEn. The main shaft 2 is supported on an apparatus frame structure (not shown) by way of springs diagrammatically indicated at 3 and 4 in FIG. 1. A rotary member 1 such as a motor vehicle wheel to be balanced can be clamped in position on the main shaft 2, more especially at the end thereof as shown in FIG. 1, by means of any suitable clamping arrangement.

The measurement value sensors may be any suitable form of oscillation or vibration measurement value sensor or force measurement value sensor.

Connected to the measurement value sensors M1 ... Mn are respective measuring channels MK1, ... MKn which operate for example on the basis of the known auto-tracking measuring process or with known digital signal analysis (in this respect reference may be made to Hofmann News 5, 09.85 D, the contents of which are incorporated as appropriate into this specification for fuller understanding thereof). As output signals, the measuring channels MK1, MK2, ... MKn supply unbalance measuring values which are associated with the respective measuring planes ME1, ME2, ... MEn. The measuring channels MK1, ... MKn are connected to an evaluation circuit as diagrammatically indicated at 9, of any suitable known configuration. In the evaluation circuit, the mass compensating operations which are to be carried out in the two compensating or balancing planes AE1 and AE2 of the rotary member 1 to be balanced are determined and indicated by display devices 10 and 11.

Reference numeral 7 in FIG. 1 identifies a calibration device which is also connected to the measuring channels MK1, ... MKn. Connected to the calibration device 7 is a storage device 6 which can be for example in the form of a read only memory. As will be described in greater detail hereinafter, the storage device 6 stores the calibration values which are calculated in the calibration device 7 and which are associated with respective types of rotary member. The storage device 6 is connected to a control device 8 and to the evaluation circuit 9, although that connection is not shown in FIG. 1.

The control device 8 is connected to switch devices S1, S2 ... Sn which are disposed in the connecting lines between the measuring channels MK1, MK2, ... Mkn and the evaluation circuit 9, and it actuates the switch devices so that, as will be described in greater detail hereinafter, a respective first and second ones of the measurement value sensors and associated measuring channels are connected to the evaluation circuit 9 during an unbalance measuring run.

Hereinafter there will first be described calibration of the measuring arrangement shown in FIG. 1 for obtaining good plane separation for different rotary members or types of rotary members. For that purpose reference will now also be made to FIG. 2.

Figure 2:
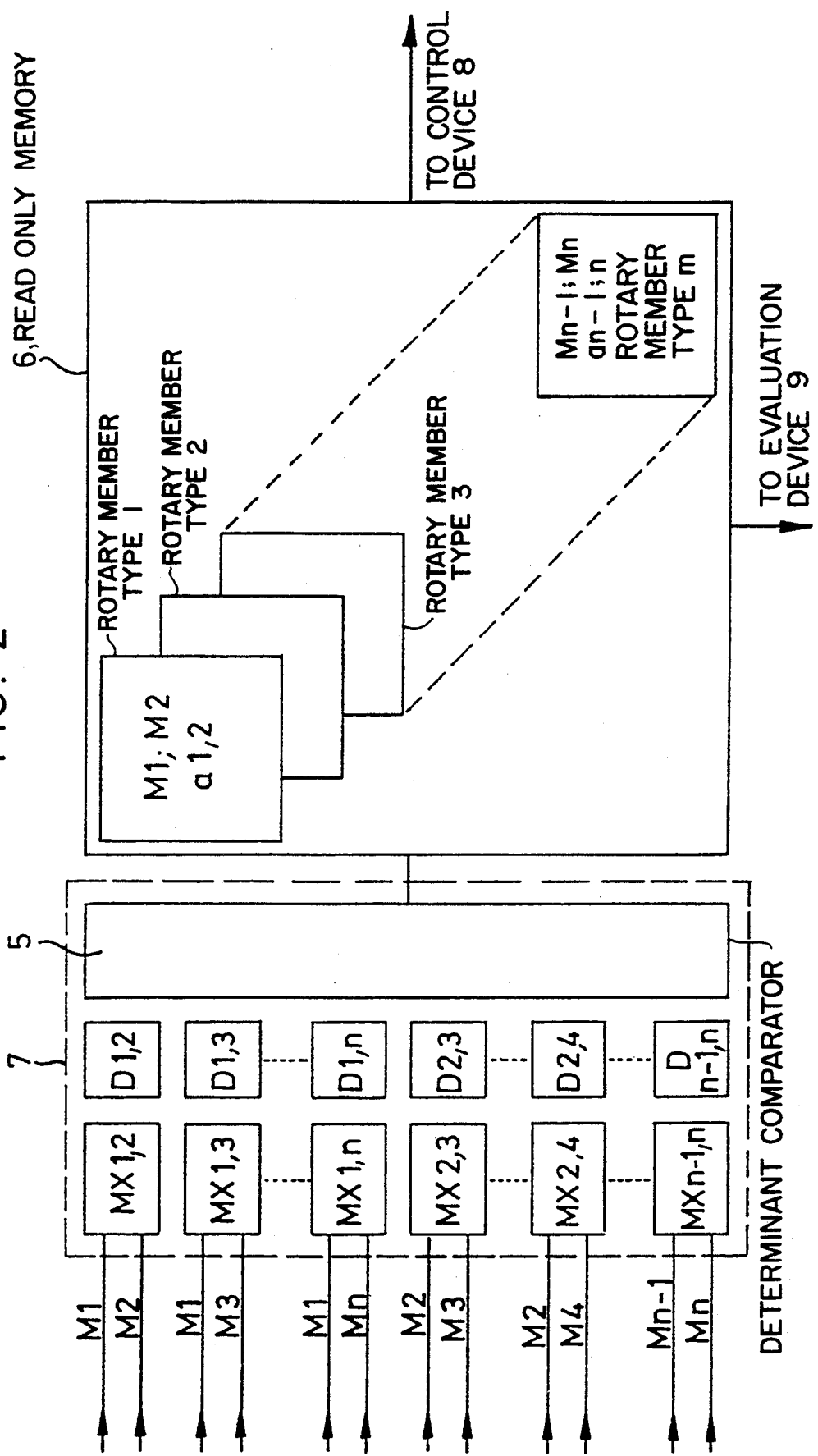
FIG. 2 shows a block circuit diagram for producing suitable correlation coefficient matrices for different types of rotary members in the embodiment shown in FIG. 1.

FIG. 2 shows a block circuit diagram of the calibration device 7. The calibration device 7 thus includes matrix computing devices MX1, 2, ... MXn-1, n which are each associated with two measuring planes or connected to two measurement value sensors (measuring channels). As FIG. 2 shows, the matrix computing device MX1, 2 is connected to the measuring channels which are associated with the pair of sensors M1, M2. The matrix computing device MX1, 3 is connected to the measuring channels of the sensors M1, M3. The matrix computing device MXn-1, n is connected to the measuring channels of the sensors Mn-1, Mn.

The matrix computing devices MX1, 2, ... MXn-1, n are connected to determinant computing devices D1, 2, ... Dn-1, n. The outputs of the computing devices D1, 2, ... Dn-1, n are connected to a determinant comparator 5.

The storage device 6 which is connected to the calibration device 7 and which, as indicated above, can preferably be in the form of a read only memory, has storage locations associated with different types of rotary member as indicated at 1, 2, 3.

For calibration of the arrangement shown in FIG. 1, a test weight as indicated at T1 in FIG. 1 is firstly used in the compensating plane AE1 of the rotor 1. A test run is then carried out. During that test run, the sensors M1, ... Mn produce force or oscillation signals which are processed in the measuring channels MK1, ... MKn to provide measurement values X11, X12, X13, ... X1n, for unbalance vectors using the known auto-tracking process or the known digital signal analysis procedure. A test weight as indicated at T2, constituting an unbalance, is then fitted into the compensating plane AE2 of the rotary member 1 and a second test run is carried out. In that operation, measurement values X21, X22, ... X2n related to the measuring planes ME1, ... MEn are ascertained, for unbalance vectors which are measured in those measuring planes. The measurement values are respectively passed in pairs to the matrix computing devices MX1, 2, ... MXn-1, n of the calibration device 7.

From the measurement values coming from the sensors M1 and M2, the matrix computing device MX1, 2 forms the matrix a1, 2 which is represented as follows:

$$\begin{vmatrix} a_{11} & a_{12} \\ a_{21} & a_{22} \end{vmatrix} = a_{1,2}$$

The measurement values coming from the measuring channels MK1 and ME3 associated with the two sensors M1 and M3 are used to form the correlation coefficient matrix a1,3, represented as follows:

$$\begin{vmatrix} a_{11} & a_{13} \\ a_{21} & a_{23} \end{vmatrix} = a_{1,3}$$

The measurement values coming from the measurement value channels MK1 and MKn form the coefficient matrix a1,n which is represented as follows:

$$\begin{vmatrix} a_{11} & a_{1n} \\ a_{21} & a_{2n} \end{vmatrix} = a_{1,n}$$

The measurement values coming from the measurement value channels MK2, MK3 of the sensors M2 and M3 provide the coefficient matrix a2,3 which is represented as follows:

$$\begin{vmatrix} a_{12} & a_{13} \\ a_{22} & a_{23} \end{vmatrix} = a_{2,3}$$

The measurement values of the two measurement value channels MK2, MK4 which are associated with the two sensors M2 and M4 are used to form the coefficient matrix a2,4 which is represented as follows:

$$\begin{vmatrix} a_{12} & a_{14} \\ a_{22} & a_{24} \end{vmatrix} = a_{2,4}$$

The measurement values from the channels MK2 and MKn which are associated with the sensors M2 and Mn are used to form the coefficient matrix a2,n which is represented as follows:

$$\begin{vmatrix} a_{12} & a_{1n} \\ a_{22} & a_{2n} \end{vmatrix} = a_{2,n}$$

The measurement values from the channels MKn-1 and MKn which are associated with the sensors Mn-1 and Mn are used to form the coefficient matrix an-1,n in the matrix computing device MKn-1,n and that coefficient matrix is represented as follows:

$$\begin{vmatrix} a_{1n-1} & a_{1n} \\ a_{2n-1} & a_{2n} \end{vmatrix} = a_{n-1,n}$$

The respective matrix elements are obtained from the measurement values and the two known test weights T1 and T2, as follows:

$$a11 = \frac{X11 - X10}{T1}$$

$$a12 = \frac{X12 - X10}{T1}$$

$$a1n = \frac{X1n - X10}{T1}$$

$$\vdots$$

$$a21 = \frac{X21 - X20}{T2}$$

$$\vdots$$

$$a2n = \frac{X2n - X20}{T2}$$

The measurement values X10 and X20 are measurement values which are associated with original unbalances of the rotary member when the method according to the invention is used for operational balancing. If a balanced rotor which has been previously balanced in the course of a zeroing procedure is used for the rotary member-type related calibration of the measuring system, the values for X10 and X20 become zero.

In the determinant computing devices D1,2 . . . Dn-1,n of the calibration device 7, the coefficient matrices a1,2, . . . an-1,n which are thus formed in the matrix computing devices MX1,2, . . . MXn-1,n are used to form the determinants of the respective correlation coefficient matrices. From those determinants, the determinant with the greatest value is then selected. In that way, the coefficient matrix at which best plane separation is achieved is obtained for a given type of rotary member for which the calibration operation was carried out with the two test runs, using the two test weights T1 and T2. The coefficient matrix which is ascertained in that way is associated with a given pair of measurement value sensors, in two given measuring planes. Both the respective pair of sensors or the two associated measuring planes and measuring channels, and the corresponding coefficient matrix, are stored in the storage location which is provided for the respectively associated type of member, in the storage device 6. As can be seen from FIG. 2, in relation to the types of rotary members indicated at 1,2, . . . m, the corresponding coefficient matrices and the associated measurement value sensors are suitably stored in that way.

That provides, for plane separation computation, numerically stable matrices which guarantee the best possible plane separation effect for the respective type of rotary member, in the predetermined measuring system, for a dynamic balancing operation.

When carrying out a procedure for measuring unbalance of a rotary member which is of a given type, in respect of which the corresponding coefficient matrix is contained in the storage device 6, the appropriate storage location in the storage device 6 can then be called up. The appropriate two measuring channels which are associated with the coefficient matrix which has been called up are connected to the evaluation device 9 by way of the control device 8. In the unbalance measuring operation therefore two sensors are selected and the measurement values from those two sensors are passed to the evaluation device 9. The evaluation device 9 further has direct access to the appropriate storage location in the storage device 6 so that plane separation is effected when evaluating the measurement values, using the suitable coefficient matrix. The unbalances which are ascertained during the measuring run are then indicated at the display devices 10 and 11, in relation to the two compensating planes AE1 and AE2 for the rotary member which is to be balanced.

In an automatic wheel balanacing installation, suitable actuation of an automatic compensating weight fitting assembly can then be effected in dependence on the measured unbalances.

In that way it is possible on a balancing machine to balance a large number of different types of rotary members involving different masses and mass moments of inertia. It is also possible to take account of wide ranges of spacings of compensating planes from each other and relative to the positions of the measurement value sensors.

It will be appreciated that the above-described method and apparatus have been set forth solely by way of example and illustration of the principles of the present invention and that various modifications and alterations may be made therein without thereby departing from the spirit and scope of the present invention.

What is claimed is:

1. In a method of unbalance measurement for an unbalance compensating operation to be carried out on a rotary member in first and second compensating planes wherein the effects of centrifugal forces produced by given test weights rotating about the axis of the rotary member in different planes perpendicular to the axis of the rotary member and at given radii are measured in measuring planes in test runs wherein the given test weights rotate in different planes and correlation coefficient matrices are evaluated for calibration of the unbalance measuring system, the improvement being that in each of the test runs said effects are measured simultaneously in more than two measuring planes which differ from the planes in which the test weights rotate, of the correlation coefficient matrices obtained in the respective measuring planes, all of determinants associated with a given type of rotary member are evaluated and the measuring planes used to ascertain the unbalance vectors of a rotary member of a given type are determined by the correlation coefficient matrix whose determinant is greatest for that type of rotary member.

2. A method as set forth in claim 1 wherein a first test run is carried out with a first test weight which rotates in a first plane and a second test run is carried out with a second test weight which rotates in a second plane.

3. A method as set forth in claim 1 wherein the test weights are caused to rotate in the test runs in planes which correspond to the compensating planes on the rotary member to be balanced.

4. A method as set forth in claim 1, wherein all of the correlation coefficient matrices whose determinants have the greatest value for a number of given types of rotary members are stored.

5. Apparatus for unbalance measurement of a rotary member which is to be balanced in first and second compensating planes, comprising:
a frame structure,
a rotary member mounting means for mounting a rotary member to be balanced,
spring means supporting the rotary member mounting means on the frame structure,
more than two measurement value generating means arranged along the axis of the rotary member mounting means for detecting influences on the rotary member mounting means and outputting electrical measurement signals,
evaluation means connected to the measurement value generating means for evaluating the electrical measurement signals supplied by the measurement value generating means to determine an unbalance compensation operation to be carried out in said compensating planes,
calibration means adapted to be connect to the measurement value generating means for determining correlation coefficient matrices for plane separation in an unbalance measurement operation,
storage means for storage of all the correlation coefficient matrices for a number of given types of rotary members, each correlation coefficient being associated with a respective pair of measurement value generating means and being determined in the calibration means, the evaluation means having access to the correlation coefficient matrices in the storage means, and
control means connected to the storage means and operable to connect first and second measurement value generating means associated in the storage means with the correlation coefficient matrix whose determinant is greatest for that type of rotary member-to be balanced to the evaluation means for determining the unbalance vectors related to the compensating planes of said rotary member.

6. Apparatus as set forth in claim 5 wherein the calibration means comprises a plurality of matrix computing means which are each connected to a respective pair of measurement value generating means, the matrix element of the correlation coefficient matrices formed by the matrix computing means being formed from the measurement signals supplied in test runs, wherein given test weights rotate in different planes, by the respective two measurement value generating means and test weights, and further including a determinant comparison means to which the matrix computing means are connected and which from the matrices formed by the matrix computing means is operable to determine the correlation coefficient matrix with the greatest determinant, the determinants of said matrix representing the calibration value for the respective type of rotary member.

7. A method of unbalance measurement of a rotary member for balancing thereof in first and second compensating planes, comprising the steps of:
performing test runs wherein the rotary member is rotated about its axis with test weights on the rotary member rotating in different planes thereof, said planes being perpendicular to the axis of rotation of the rotary member, and in each test run the effects of centrifugal forces produced by said test weights are measured simultaneously in more than two measuring planes which differ from the said planes in which the test weights rotate so as to provide correlation coefficient matrices in the respective measuring planes;
evaluating all of determinants of the correlation coefficient matrices associated with a given type of rotary member; and
ascertaining unbalance vectors of a rotary member of a given type in the respective measuring planes by use of the measuring planes which are determined by the correlation coefficient matrix whose determinant is greatest for that type of rotary member.

* * * * *